(12) United States Patent
Zhang et al.

(10) Patent No.: US 11,995,309 B2
(45) Date of Patent: May 28, 2024

(54) INFORMATION PROCESSING METHOD AND INFORMATION PROCESSING APPARATUS

(71) Applicant: Lenovo (Beijing) Limited, Beijing (CN)

(72) Inventors: Zhenlong Zhang, Beijing (CN); Yuliang Wang, Beijing (CN); Chen Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/179,127

(22) Filed: Mar. 6, 2023

(65) Prior Publication Data

US 2023/0297230 A1    Sep. 21, 2023

(30) Foreign Application Priority Data

Mar. 18, 2022    (CN) .......................... 202210271925.4

(51) Int. Cl.
*G06F 3/04883*    (2022.01)
*G06F 16/538*    (2019.01)
*G06V 30/32*    (2022.01)

(52) U.S. Cl.
CPC ........ *G06F 3/04883* (2013.01); *G06F 16/538* (2019.01); *G06V 30/36* (2022.01)

(58) Field of Classification Search
CPC .... G06F 3/04883; G06F 16/538; G06V 30/36
See application file for complete search history.

(56) References Cited

U.S. PATENT DOCUMENTS

| | | | |
|---|---|---|---|
| 10,895,454 B2* | 1/2021 | Moriguchi | G06V 40/20 |
| 2007/0071285 A1* | 3/2007 | Kontsevich | G06V 10/757 382/103 |
| 2009/0063431 A1* | 3/2009 | Erol | G06V 10/993 |
| 2013/0021272 A1* | 1/2013 | Wang | G06F 3/0416 345/173 |
| 2014/0219634 A1* | 8/2014 | McIntosh | G06F 3/0484 386/278 |
| 2021/0342138 A1* | 11/2021 | Guo | G06N 20/00 |

* cited by examiner

*Primary Examiner* — Seth A Silverman
(74) *Attorney, Agent, or Firm* — ANOVA LAW GROUP, PLLC

(57) ABSTRACT

An information processing method includes receiving a user input, the user input representing a trajectory, performing recognition on the trajectory to obtain a matching result based on matching in a database, recording the trajectory to generate an image including the trajectory, and outputting a candidate option. The candidate option includes the matching result and an identifier of an image.

20 Claims, 10 Drawing Sheets

INFORMATION PROCESSING METHOD AND INFORMATION PROCESSING APPARATUS

CROSS-REFERENCE TO RELATED APPLICATION

This application claims priority to Chinese Patent Application No. 202210271925.4, filed on Mar. 18, 2022, the entire content of which is incorporated herein by reference.

TECHNICAL FIELD

The present disclosure relates to the information processing technology field and, more particularly, to an information processing method and an information processing apparatus.

BACKGROUND

With the continuous development of computer technology, information contents communicated, interacted with, and shared by people are in various forms. The forms of the information contents include but are not limited to text, images, animation, etc.

However, if a user wants to share an image manually drawn by the user, the user needs to draw on an application, e.g., a drawing pad, and then the user needs to save a drawing file in memory as an image file. Then, the drawing file can be shared or used in another application (e.g., social media, text editor, etc.). Such an interaction is cumbersome, and the user experience is poor.

SUMMARY

Embodiments of the present disclosure provide an information processing method. The method includes receiving a user input, the user input representing a trajectory, performing recognition on the trajectory to obtain a matching result based on matching in a database, recording the trajectory to generate an image including the trajectory, and outputting a candidate option. The candidate option includes the matching result and an identifier of an image.

Embodiments of the present disclosure provide an information processing apparatus, including a monitor, a processor, and a memory. The monitor is configured to output a to-be-displayed content. The memory is used to store executable information processing instructions that, when executed by the processor, cause the processor to receive a user input, the user input representing a trajectory, perform recognition on the trajectory to obtain a matching result based on matching in a database, record the trajectory to generate an image including the trajectory, and output a candidate option. The candidate option includes the matching result and an identifier of an image.

Embodiments of the present disclosure provide a non-transitory computer-readable storage medium storing executable information processing instructions that, when executed by a processor, cause the processor to receive a user input, the user input representing a trajectory, perform recognition on the trajectory to obtain a matching result based on matching in a database, record the trajectory to generate an image including the trajectory, and output a candidate option. The candidate option includes the matching result and an identifier of an image.

DETAILED DESCRIPTION OF THE EMBODIMENTS

The technical solutions of embodiments of the present disclosure are described in detail with reference to the accompanying drawings of embodiments of the present disclosure.

To make the objects, technical solutions, and advantages of embodiments of the present disclosure clearer, the present disclosure is further described in detail below with reference to the accompanying drawings of embodiments of the present disclosure. The described embodiments do not limit the present disclosure. All other embodiments obtained by those skilled in the art without creative effort are within the scope of the present disclosure.

In the following description, "some embodiments" and "some other embodiments" describe a subset of all possible embodiments. "some embodiments" and "some other embodiments" can include a same subset or different subsets of all possible embodiments and can be combined with each other when there is no conflict.

Unless otherwise specified, all technical and scientific terms used here can have the same meaning as commonly understood by those of ordinary skill in the art. The terms used here are for the purpose of describing embodiments of the present disclosure only and are not intended to limit the present disclosure.

More and more users want to share using an information content format such as an image or an animation. Through an input trajectory of a user, image information (i.e., an image or animation) corresponding to the trajectory can be generated. During social interaction, the user can choose to send the image or the animation to another user or display the image or the animation. However, currently, the user needs to first input the trajectory in an information input interface of an application that can be used to generate image information. Then, the user needs to save the generated image information corresponding to the trajectory. Then, the user can share the image information on social media. During this process, the user needs to perform a plurality of operations, and the user experience is poor.

Based on the above problem, embodiments of the present disclosure provide an information processing method. With the information processing method, a plurality of interactions between the user and the application can be avoided to improve the user experience by ensuring a diversity of information content forms.

The information processing method of embodiments of the present disclosure can be applied to an information processing apparatus. The method of embodiments of the present disclosure can be implemented by a computer program. When the computer program is executed, processes of the information processing method of embodiments of the present disclosure can be implemented. In some embodiments, the computer program can be executed by a processor of the information processing apparatus.

Figure 1:
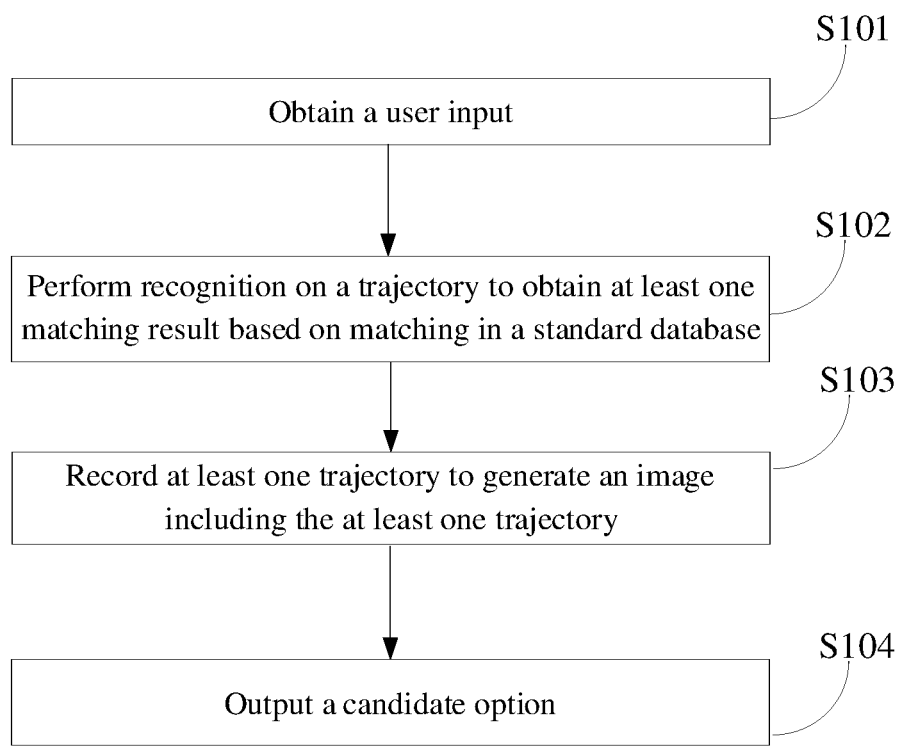
FIG. 1 illustrates a schematic flowchart of an information processing method according to some embodiments of the present disclosure.

The information processing method of embodiments of the present disclosure is described below. FIG. 1 illustrates a schematic flowchart of an information processing method according to some embodiments of the present disclosure. The method includes the following processes.

At S101, a user input is obtained.

In some embodiments, the timing for obtaining the user input can be after an input method application is started. After directly entering a manual writing input mode or switching to the manual writing input mode from another input mode, an input trajectory of the user can be obtained from an input interface corresponding to the manual writing input mode. The user can input a trajectory through finger touch or stylus touch.

Obtaining the user input can include obtaining input information when the user performs an input operation. The input information can include trajectory information of the input operation. In some embodiments, the user input can represent at least one trajectory. The trajectory inputted by the user can be a character trajectory or a graphic trajectory. For example, the user may be intended to enter a character "人." During an inputting process, a character trajectory "丿" and a character trajectory "乀" can be included. If the user is intended to enter a heart figure "♡," the image trajectory corresponding to the inputting process can include an arc shape.

In some embodiments, one or more trajectories inputted by the user can be included. One trajectory can correspond to one continuous input. A plurality of trajectories can correspond to a plurality of discontinuous inputs. The continuous input can include that when the user inputs at the input interface in a finger-touch manner or a stylus-touch manner, the finger or stylus does not leave the input interface and continuously performs the input until the input is completed. For example, for a text input, when the user inputs a character "一," only one input trajectory of "一" can be included. When the user inputs a character "今," four non-continuous input trajectories of "丿," "乀," "丶," "フ" can be included. For a less complex character, the user can also complete the input of an image shape through a continuous input. The user can obtain one trajectory through the continuous input or a plurality of trajectories through a plurality of non-continuous inputs. The number of trajectories inputted by the user is exemplary, which is not limited here.

At S102, recognition is performed according to the trajectory, and matching is performed based on a database to obtain at least one matching result.

The database can include a database storing a large amount of character data and graphic data. The character data can include a character, a number, a punctuation, a stroke, etc. The graphic data can include a heart shape, a circular shape, and an expression graphic. After the trajectory input by the user is obtained, the input trajectory can be recognized. A recognition result can be matched with the character data or the graphic data in the database to obtain a matching degree between the trajectory and the character data or graphic data in the database. A matching result corresponding to the trajectory can be determined according to the matching degree. The matching result of the trajectory can include N characters or graphics with highest matching degrees that are greater than a matching threshold.

In some embodiments, the recognition and matching can be performed on the trajectory in real-time. That is, the recognition and matching can be performed while the user inputs the trajectory. For example, during a process of inputting the character "今," when the input trajectory is "丿," a matching result recognized corresponding to the trajectory can include "人," "么," and "少." When the user continues to input the trajectory of "乀," the recognized matching result corresponding to the input trajectory can include "八," and "只." Until the user completes entering all strokes of the character "今," the matching result corresponding to the entire input trajectory can include the character "今."

In some embodiments, one or more matching results obtained by performing matching based on the database can be included. A type of the matching result can include the character and the graphic. The number of matching results can be one or more. For example, when the trajectory input by the user is "○" a corresponding matching result can include a character such as "口," "凵," "。" and a graphic "☺." In some embodiments, a number of trajectories of each of the characters and graphics can be one or more.

At S103, at least one trajectory is recorded, and an image of the at least one trajectory is generated.

In some embodiments, in a process of performing recognition on the trajectory input by the user, the input trajectory can be recorded, and the image corresponding to the trajectory can be generated. The image can be a static image or a dynamic image. When only one input trajectory is included in one input of the user, the image generated based on the input trajectory can include a shape corresponding to the trajectory. When a plurality of trajectories are included in one input of the user, a corresponding image can be generated each time a trajectory is inputted. If the generated image is a dynamic image, each trajectory can correspond to a frame image of the generated dynamic image. After the user inputs the plurality of trajectories, a plurality of generated frame images can form the dynamic image.

Unlike process S102, after the trajectory input by the user is recorded, the trajectory is not recognized and matched, but the corresponding image can be directly generated based on the trajectory. The image can include the trajectory input by the user. That is, the shape of the trajectory input by the user and the shape corresponding to the generated image can be kept consistent.

In some embodiments, process S102 and process S103 can be performed simultaneously. That is, while the recognition and the matching are performed on the trajectory input by the user, the image corresponding to the trajectory can be generated. In some other embodiments, process S102 can be performed before process S103 or after process S103.

At S104, a candidate option is outputted.

In some embodiments, the candidate option can include at least one matching result and an identifier of an image. The identifier of the image can be a thumbnail corresponding to the image, a dynamic GIF image, or an option of an identifier of an image. The identifier of the image can indicate that an image has been generated based on the user input trajectory. The user can select the identifier of the image. The image can be sent or displayed through the identifier of the image.

In some embodiments, after the candidate option is obtained based on the user input trajectory, the candidate option can be output and displayed in a candidate area of a handwriting input application for the user to select.

In the information processing method of embodiments of the present disclosure, the user input can be obtained first. The user input can represent at least one trajectory. Then, the recognition can be performed on the trajectory. At least a matching result can be obtained based on the database. The at least one trajectory can be recorded to generate the image including the at least one trajectory. The candidate option can be output. The candidate option can include the at least one matching result and the identifier of the image. Thus, based on the at least one trajectory input by the user, the at least one matching result can be obtained, and the image including the at least one trajectory can be obtained simultaneously. Thus, the output candidate option of the application can include the at least one matching result and the identifier of the image. During application, the user can perform a selection on the matching result or the identifier of the image directly in the candidate option. By ensuring the diversity of the information content forms, the plurality of interactions between the user and the application can be avoided to improve the user experience.

In some embodiments of the present disclosure, the user input is obtained. That is, process S101 can be implemented by processes S1011 and S1012 below.

At S1011, an N-th trajectory is obtained.

N can be an integer greater than or equal to 1. When N is 1, a first trajectory input by the user can be obtained. When N is 5, a 5th trajectory input by the user can be obtained. The N-th trajectory can only represent a sequence corresponding to the trajectory and does not limit the number of trajectories input by the user. In a user input, a plurality of trajectories input by the user can be obtained continuously. According to a time sequence, an arrangement sequence corresponding to trajectories input first can be greater than an arrangement sequence corresponding to trajectories input later.

At S1012, an (N+1)-th trajectory is obtained before the N-th trajectory reaches the time when the trajectory disappears (i.e., disappearance time).

The disappearance time can be any predetermined positive number. For example, the disappearance time can be set to 0.5 second, 1 second, etc. In some embodiments, a timer can be started after the input N-th trajectory is received. A time length of the timer can be recorded. When the time length of the timer reaches the predetermined disappearance time, The N-th trajectory can be determined to reach the disappearance time. In the disappearance time, the trajectory input by the user does not disappear. When the last trajectory (e.g., the N-th trajectory) does not disappear, the user can continue to input the trajectory to obtain the current input trajectory (e.g., (N+1)-th trajectory). The trajectory obtained before the last trajectory disappears can be used as the last trajectory in the current user input process.

In some embodiments, when the N-th trajectory reaches the disappearance time, the user input can be indicated to be complete. That is, after the user inputs the N-th trajectory, the (N+1)-th trajectory is not continuously input within the disappearance time, which indicates that a user input process is finished.

For example, N can be 1, the disappearance time can be 0.5 second, and the first trajectory input by the user can be "一." The second trajectory is not input within 0.5 second. Then, in the input process, only one trajectory can be included. The recognition and the matching can be performed based on the trajectory to obtain the corresponding matching result and generate the corresponding image based on the trajectory. When the first trajectory input by the user is "一," in the 0.5 second, i.e., before the first trajectory disappears, the second input trajectory "丨" can be obtained. After the second trajectory is input, the first trajectory can reach the disappearance time of 0.5 second. Thus, in the input process, two input trajectories can be included. The recognition can be performed on the two trajectories to obtain the matching result corresponding to the two trajectory combinations. The image generated based on the two trajectories can also include the shapes corresponding to the two trajectories.

In some embodiments of the present disclosure, the recognition can be performed on the trajectory. The at least one matching result can be obtained based on the matching in the database. That is, process S102 can be implemented in at least one manner below.

In the first implementation manner, the recognition can be performed on the trajectory, matching can be performed based on the database to obtain the at least one character.

The character database can be one of the databases. The character database can be a database storing character information. The character database can store character information such as a character, a number, and punctuation. The character database can be pre-established. The character database can include relatively complete character information. Thus, after the user inputs the trajectory, more and more accurate matching results can be obtained for the user to select.

For example, when the trajectory input by the user is "2," after the recognition is performed on the trajectory, matching can be performed on the recognition result with the characters in the character database. According to an amplitude of the matching degree, the obtained matching result can include "2," "z," "红," and "窄."

In some embodiments, recognition can be performed on the trajectory. At least one image can be matched based on an image database.

The graphic database can also be one of the databases. The graphic database can be a database storing graphic information. The graphic database can store information such as a graphic shape and an expression. The graphic database can also be pre-established. After the user obtains the trajectory input by the user, the recognition can be performed on the trajectory to obtain the image matching the image database. For example, the trajectory input by the user can be "◯," and an obtained recognition result can include " " and "☺."

In some embodiments, process S102 can be implemented by the above first implementation manner, the above second implementation manner, or an implementation manner based on the first implementation manner and the second implementation manner. That is, when the recognition is performed on the trajectory input by the user, the matching can be performed based on both the character database and the graphic database to obtain the character-matching result and the graphic-matching result.

When the recognition is performed on the trajectory, the matching can be performed through the character database and the graphic database to obtain the character matching result and the graphic matching result to provide diverse forms of information contents to the user to improve the user experience.

In some embodiments of the present disclosure, when the recognition is performed on the trajectory, if the (N+1)-th trajectory is obtained, the recognition can be performed on a combination of the N-th trajectory and the (N+1)-th trajectory.

If the (N+1)-th trajectory is obtained after the N-th trajectory is obtained and before the N-th trajectory reaches the disappearance time, the recognition can be performed on the combination of the N-th trajectory and the (N+1)-th trajectory. On one aspect, each trajectory can be recognized in real-time. On another aspect, for the one-time input process that includes the plurality of trajectories, the recognition can be performed on the combination of the plurality of trajectories. That is, the current trajectory input by the user can be recognized in real-time, while the recognition can be performed on the combination of the next trajectory and the current trajectory. For example, if the user is intended to input an English word "hello," 5 trajectories input by the user can be obtained. When a first trajectory input by the user is obtained, a recognized matching result can be a letter "h." A second trajectory input by the user can be obtained before the first trajectory disappears. Then, the first trajectory and the second trajectory can be recognized as "he." Before the first trajectory and the second trajectory disappear, a third trajectory can be obtained. Then, the first trajectory, the second trajectory, and the third trajectory can be recognized as "hel," and so on, until a fifth trajectory input by the user is obtained. Then, the English word "hello" can be recognized.

In some embodiments, the recognition of the combination of the N-th trajectory and the (N+1)-th trajectory does not refer to only the recognition of the combination of two neighboring trajectories. The one-time input process of the user can include more than two trajectories, for example, three trajectories. When the recognition is performed, when N is 1, the recognition can be performed on the combination of the first trajectory and the second trajectory to obtain a recognition result. When N is 2, the recognition can be performed on the combination of the first trajectory, the second trajectory, and the third trajectory. That is, the N-th trajectory can be a combination of the plurality of trajectories input by the user and may not refer to a previous trajectory of the (N+1)-th trajectory.

In some embodiments of the present disclosure, the at least one trajectory can be recorded, and the image including the at least one trajectory can be generated. That is, process S103 can be implemented through processes S1031 and S1032, which are described below.

At S1031, a type of the application is recognized. The application is an application including an input box and a cursor located in the input box.

The input window of the application can be used to display the character, the graphic, and the image. For social media software such as an instant messaging application, the input box can be an area configured to input information. For a document editing program such as a notepad, the input box can be at a position where a document is displayed. When the cursor is located in the input box of the application, the application can send an instruction to the input method application. Thus, the input method application can be started, and the handwriting input mode can be entered. The trajectory input by the user can be obtained based on the handwriting input of the user.

At S1032, if the type of the application satisfies the image condition, the at least one trajectory is recorded, and the image including the at least one trajectory is generated.

In some embodiments, after the trajectory input by the user is obtained, whether the application interacting with the input method application satisfies the image condition can be determined. That is, whether the application supports using the image generated based on the trajectory as an input or receives an image transmitted by the input method application and displays the image in the application. If the application is determined to satisfy the image condition, one or more trajectories input by the user can be recorded, and a corresponding image can be generated based on the one or more trajectories.

In other embodiments, if the type of the application does not satisfy the image condition, the at least one trajectory input by the user cannot be recorded, and no image can be generated. Thus, the candidate option may not include the identifier of the image. The candidate option can only include the characters and graphics obtained after performing the recognition and matching on the trajectory.

By determining whether the application satisfies the image condition, whether the trajectory input by the user is recorded to generate the corresponding image can be determined. When the application satisfies the image condition, the trajectory can be recorded, and the corresponding image can be generated based on the recorded trajectory. Thus, the candidate option can include the character, the graphics, and the image, which ensures the diversity of information type in the candidate option to provide the user with more options.

In some embodiments of the present disclosure, the candidate option can be output. That is, process S104 can be implemented by process S1041A and process S1042A.

At S1041A, if at least one matching result does not include a matching result meeting an accurate matching condition, the identifier of the image is used as a first item of the candidate option.

In some embodiments, the candidate option can be displayed in the candidate area of the input method application. When the matching result matching the accurate matching condition is not obtained from the database after the recognition is performed on the trajectory input by the user, that is, no accurate matching result is obtained, fuzzy matching can be performed on the recognized trajectory to obtain a fuzzy matching result.

An accurate matching condition can be used to determine whether the matching result is accurate. When the accurate matching condition is met, the accurate matching result can be obtained. When the accurate matching condition is not met, the fuzzy matching result can be obtained. The exact matching result and the fuzzy matching result can indicate the amplitude of the matching degree. The accurate matching condition can be greater than a matching threshold. The matching threshold can be predetermined and can be used to represent the similarity between the recognized trajectory and the characters or graphics in the database. In some embodiments, the matching threshold can be 0.9. That is, after the recognition is performed on the trajectory, and after the matching is performed, the obtained matching value corresponding to a matching result can be greater than 0.9. Thus, the matching result can be determined to satisfy the accurate matching condition, that is the accurate matching result. When the matching result corresponding to the matching result can be smaller than or equal to 0.9, the matching result can be considered to be the fuzzy matching result.

In some embodiments, if the matching is performed on the trajectory to obtain the accurate matching result, the accurate matching result can be used as the first option. Then, the identifier of the image can be used as a sub-option or a non-first option. In some embodiments, one or more accurate matching results can be included. When a plurality of accurate matching results are included, the plurality of accurate matching results can be sorted according to the amplitude of the matching threshold to determine the first option, the second option, the third option, etc., and so on.

Figure 2:
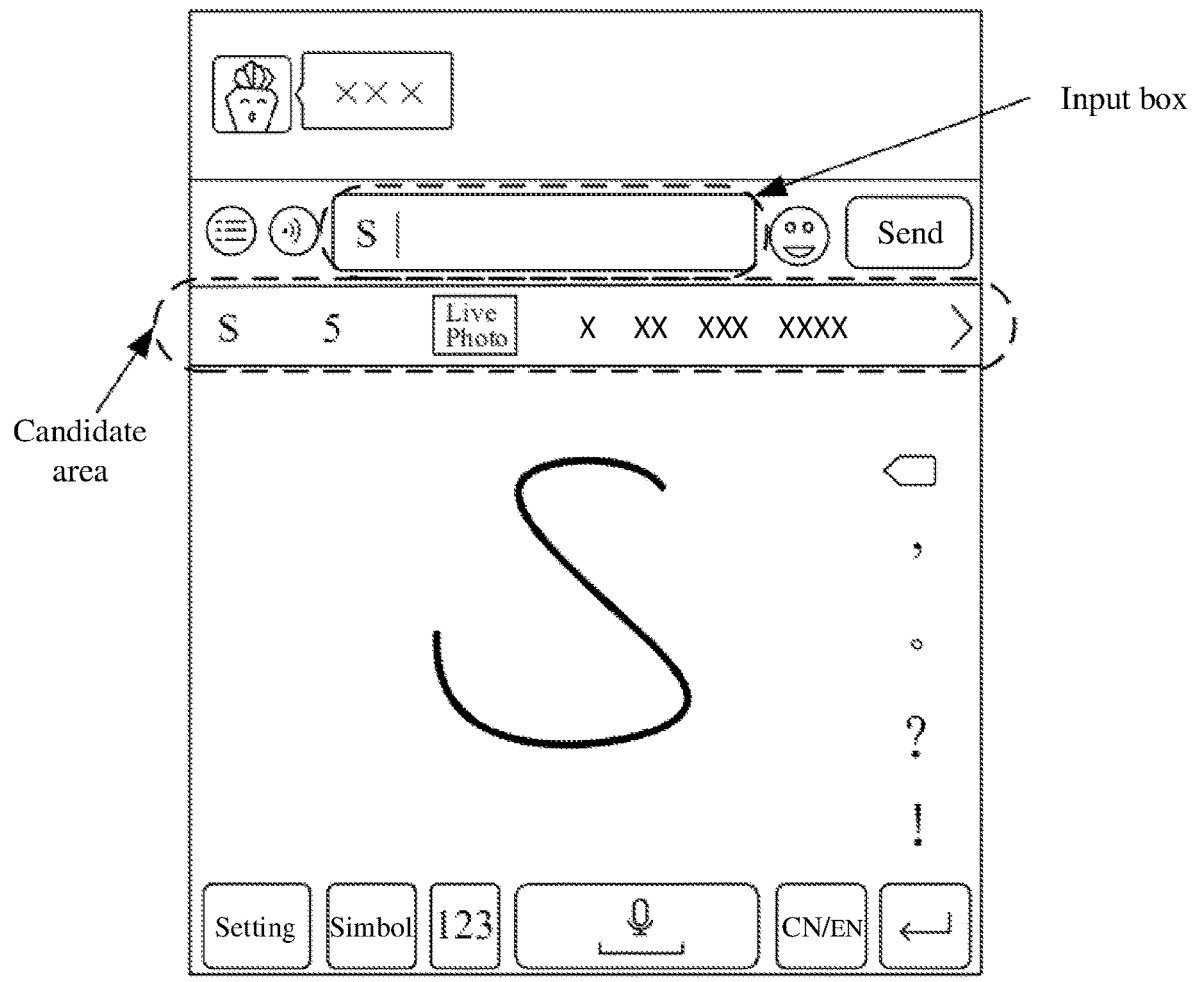
FIG. 2 illustrates a schematic diagram showing a display interface of a candidate option according to some embodiments of the present disclosure.

In some embodiments, the candidate option can include a plurality of options. The first option of the candidate option can be located at the first position of the candidate area. For example, FIG. 2 illustrates a schematic diagram showing a display interface of a candidate option according to some embodiments of the present disclosure. When the user inputs one trajectory, the matching result obtained based on the trajectory can include the letter "S" of the first candidate option (i.e., the first option in the candidate option) shown in the candidate area of the handwriting method. The matching result can also include the second candidate number "5" or the third candidate option, i.e., the identifier of the image "Live Photo" corresponding to the image generated based on the trajectory. The first candidate option can be the accurate matching result. Further, if the user chooses the first candidate option, "S" can be displayed in an input block of the application. If the user selects the second candidate option, "5" can be displayed in the input block of the application. If the user selects the third candidate option, the image corresponding to the identifier of the image can be displayed in the input block of the application.

Figure 3A:
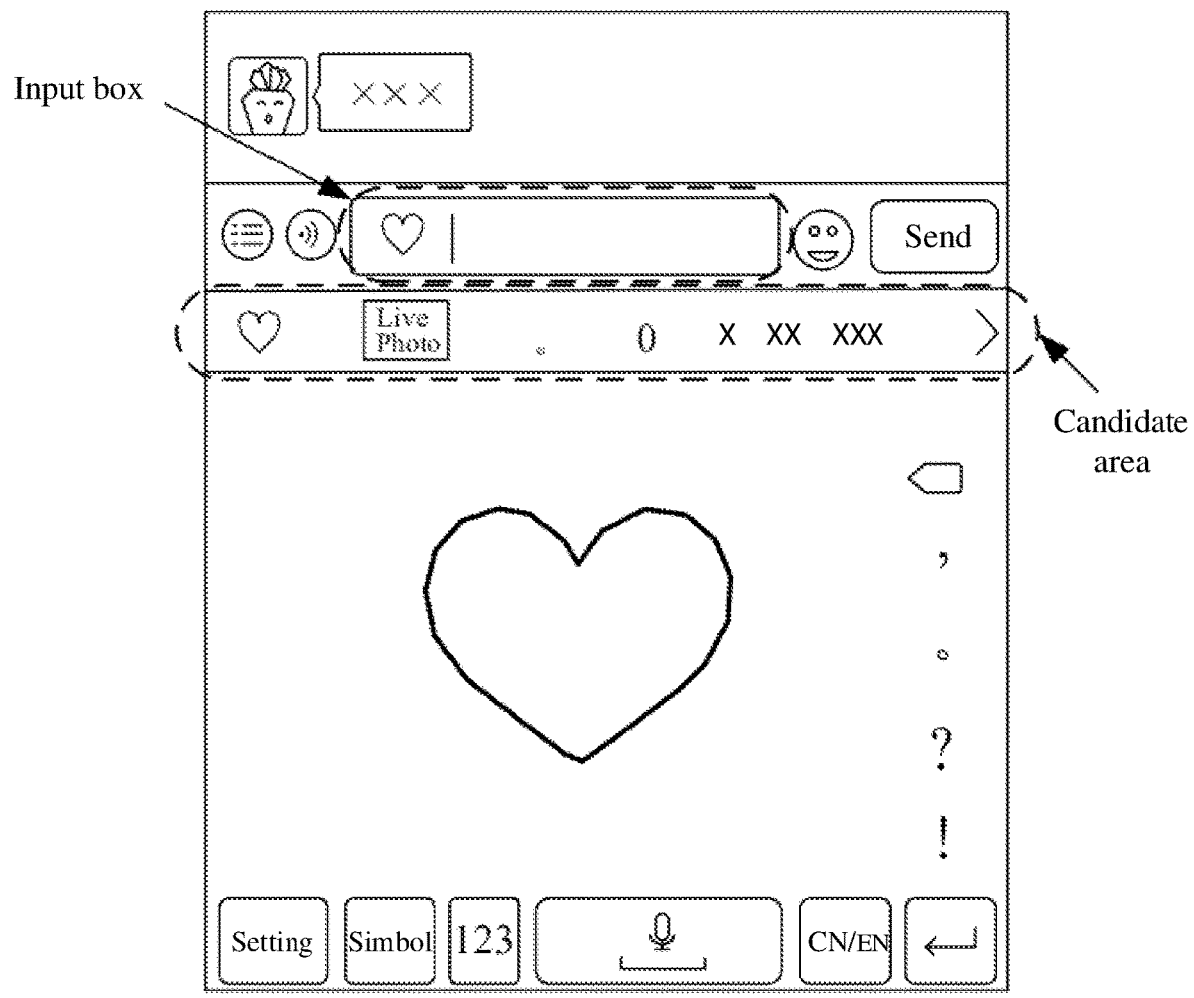
FIGS. 3A and 3B illustrate a schematic diagram showing a displaying process of a candidate option according to some embodiments of the present disclosure.
Figure 3B:
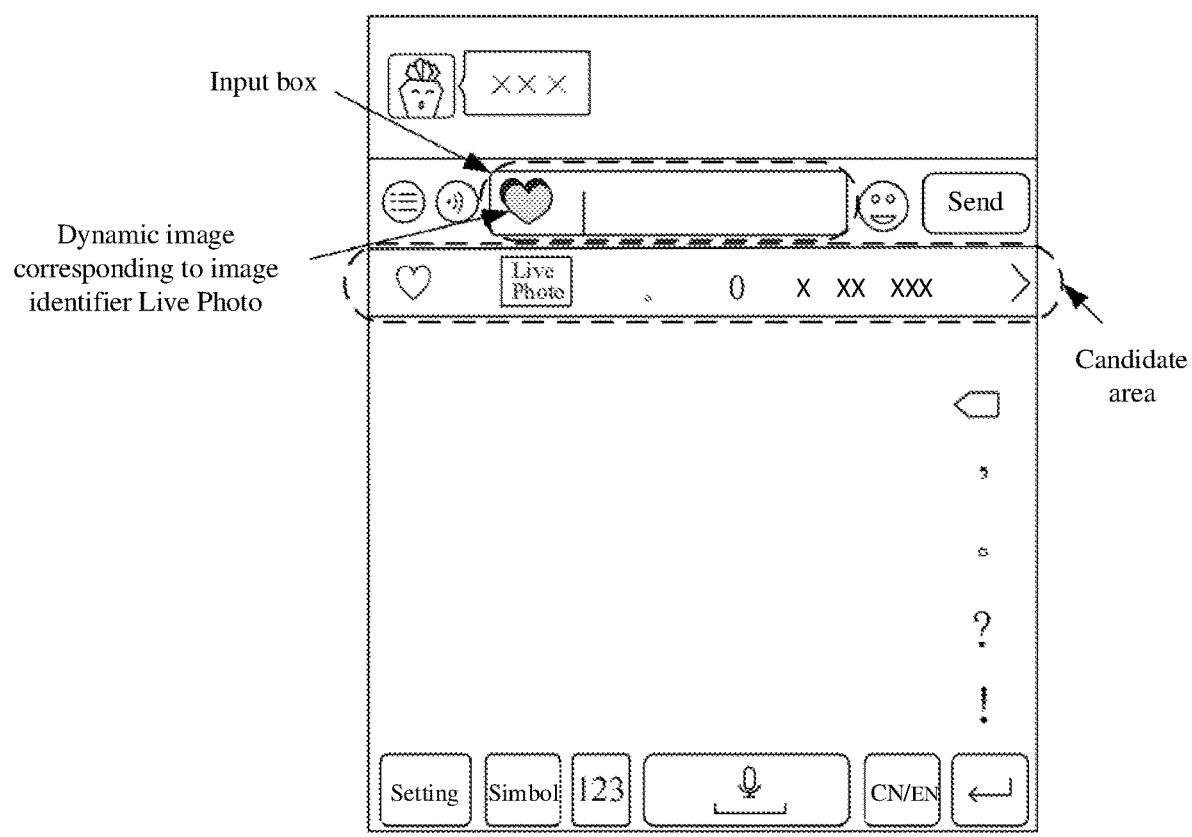

In some embodiments, for example, if the trajectory input by the user is similar to a heart shape, the first candidate option obtained by performing the recognition on the trajectory can be a heart shape displayed in the candidate area of the handwriting input method of FIG. 3A. The second candidate option can be the identifier of the image based on the trajectory, i.e., the identifier of the image "Live Photo" shown in the candidate area of the handwriting input method in FIG. 3A. When the user clicks on the identifier of the image "Live Photo," the dynamic image corresponding to the identifier of the image is displayed in the input block of the application (e.g., instant communication application) in FIG. 3B.

Figure 4A:
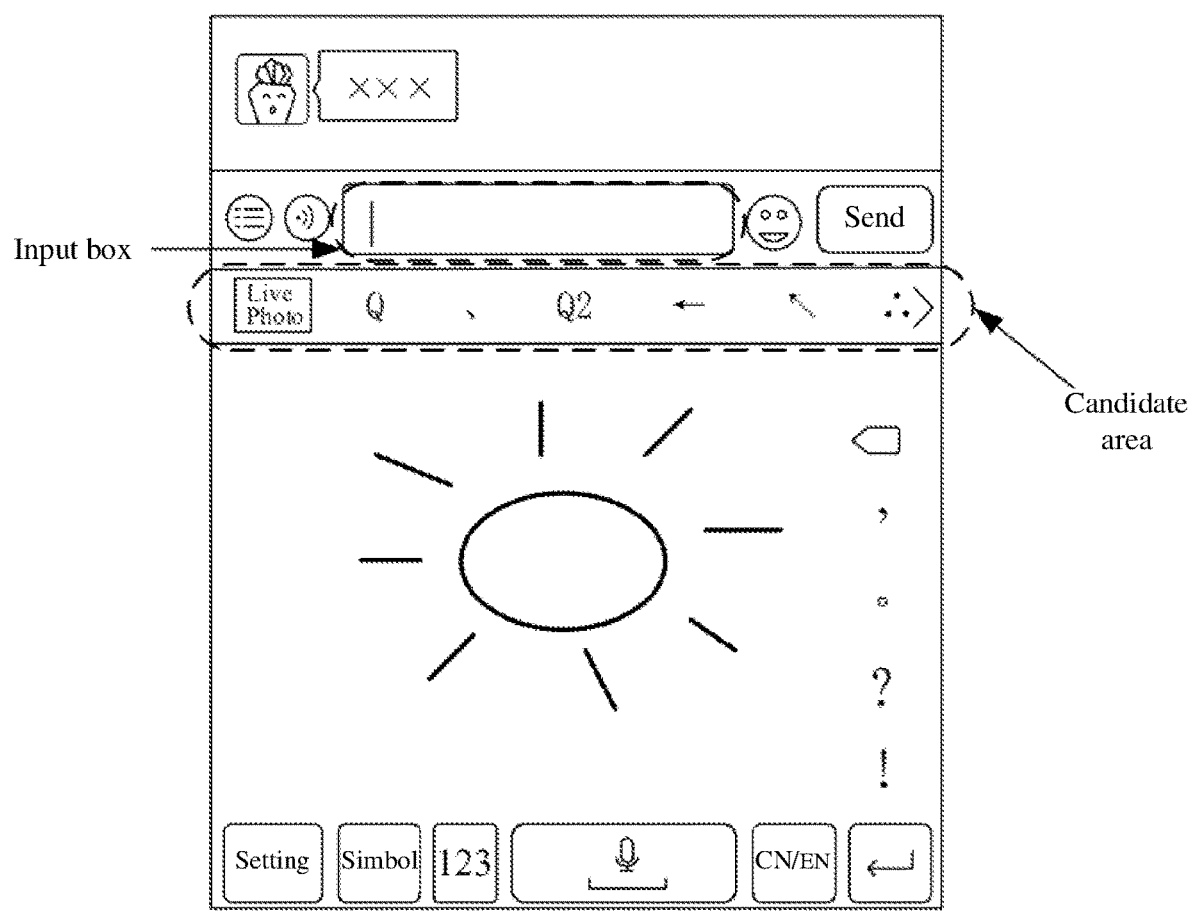
FIGS. 4A to 4C illustrate a schematic diagram showing a displaying process of another candidate option according to some embodiments of the present disclosure.
Figure 4B:
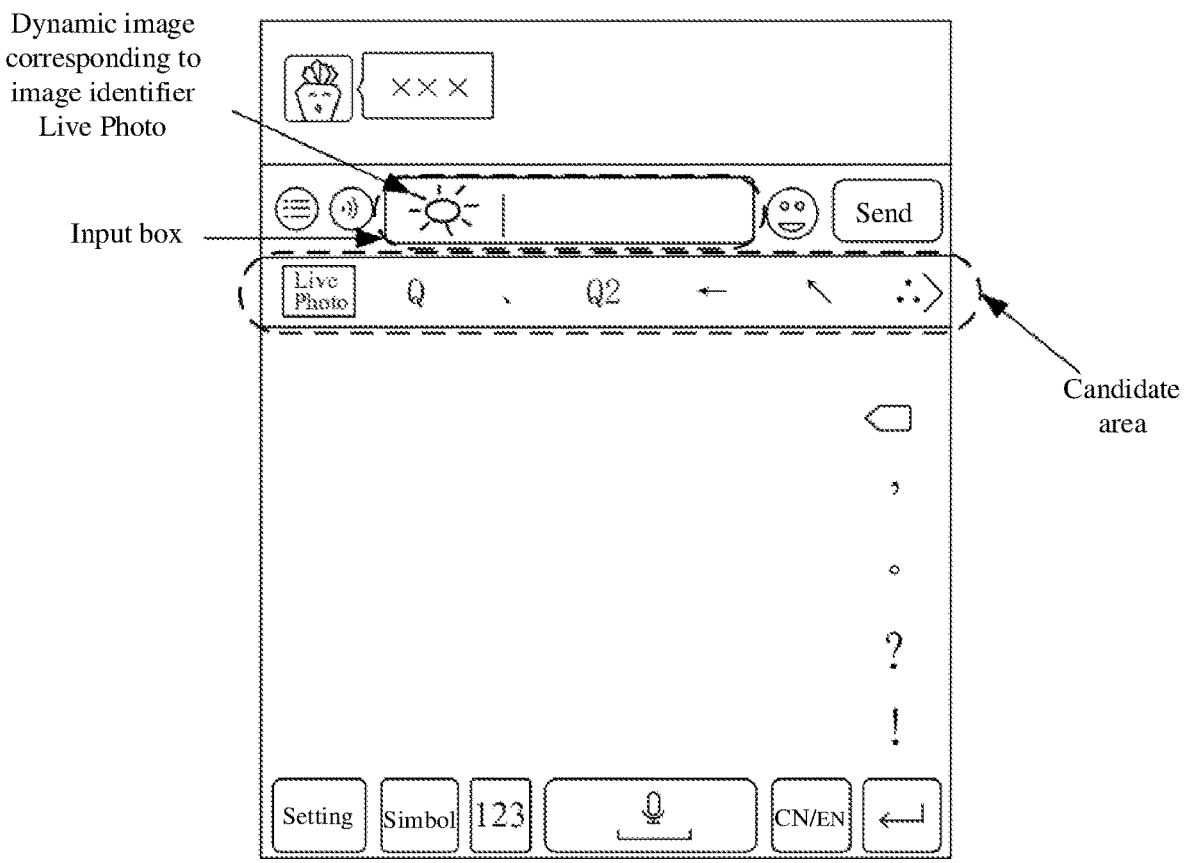
Figure 4C:
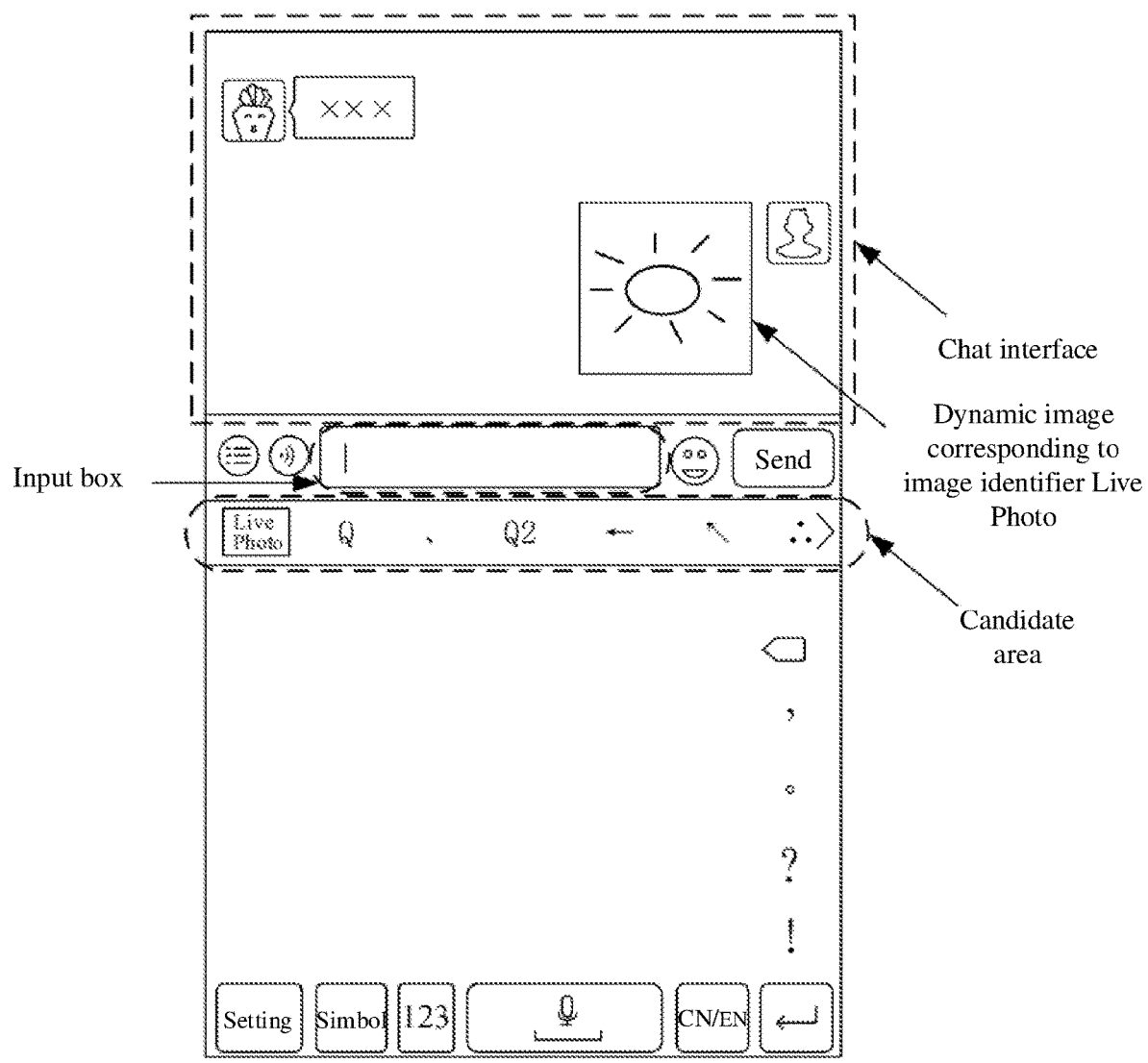

In some other embodiments, if no accurate matching result is obtained by performing the matching on the trajectory, and only the fuzzy matching result is obtained, the identifier of the image can be generated based on the trajectory as the first option. For example, when the user inputs the trajectory information, a circular trajectory can be input, and a plurality of line trajectories can be input around the circular trajectory. If the accurate matching result corresponding to the trajectory cannot be obtained from the database. Thus, the identifier of the image "Live Photo" corresponding to the image generated based on the trajectory can be used as a fuzzy matching result. The identifier of the image "Live Photo" can be used as the first option of the candidate option and can be displayed at the first position in the candidate area of the handwriting input method shown in FIG. 4A. When the user clicks on the identifier of the image "Live Photo," the image is displayed in the input block of the application (e.g., instant communication media application) shown in FIG. 4B. When the user clicks on a control key of "send," an image similar to the sun is displayed in the chat interface of the application (e.g., instant communication media application) shown in FIG. 4C.

After the recognition and the matching are performed on the trajectory input by the user, the accurate matching result is not obtained. The intention of the user can be estimated to generate the image based on the input trajectory. The identifier of the image can be used as the first option of the candidate option for the user to select. In some embodiments, for the input method applicated, the user can select the identifier of the image by clicking on the return key and the blank key to provide the user with more convenient and diverse experience.

At S1042A, the candidate option is output according to the identifier of the image and the at least one matching result.

In some embodiments, when the matching result satisfying the accurate matching condition is determined to be not included in the matching result, the identifier of the image can be determined to be the first option of the candidate option. Meanwhile, based on the recognition and the matching of the trajectory, the fuzzy matching result can be obtained. One or a plurality of fuzzy matching results can be included. In some embodiments, when the plurality of fuzzy matching results are included, an arrangement sequence of the candidate option can be determined according to a matching value corresponding to the fuzzy matching results. On one aspect, the larger the matching value is, the corresponding fuzzy matching result can be more in the front. For example, two fuzzy matching results can be included. A matching value corresponding to fuzzy matching result a can be 0.5. A matching value corresponding to fuzzy matching result b can be 0.6. Thus, fuzzy matching result b can be used as a second candidate option, and fuzzy matching result a can be used as a third candidate option.

In some other embodiments of the present disclosure, outputting the candidate option, i.e., process S104, can also be implemented by processes S1041B and S1042B, which are described in detail below.

At S1041B, a type of the application is recognized. The application is an application that supports the candidate option as input.

The application can be an application interacting with the input method application. If the application supports using the candidate option as the input, the candidate option can be sent to the application and displayed in the application. After the matching result corresponding to the trajectory is obtained, the character or graphic of the candidate option can be output and displayed in the candidate area of the input method. Based on the selection of the user on the candidate option, the corresponding candidate option can be displayed in the application.

In some embodiments, if the application does not support the candidate option as an input, the candidate option cannot be output and displayed in the candidate area of the input method even if the corresponding matching result is obtained based on the trajectory input by the user.

In some embodiments, the application with the candidate option as the input can include a social media application and a document editing application, such as notepad and word. These applications can be applications that support characters and graphics as input.

At S1042B, if the type of the application satisfies the image condition, the output candidate option includes the identifier of the image.

The image condition can include whether the application supports a function corresponding to the image generated based on the trajectory, that is, whether the application can receive and display the image sent through the input method. If the application satisfies the image condition, the identifier of the image generated based on the trajectory can be output as the candidate option.

In some other embodiments, if the application does not satisfy the image condition, the image generated based on the trajectory cannot be used as the candidate option. That is, the generated image identifier cannot be displayed in the candidate area corresponding to the input method application.

In some embodiments, generating the image based on the trajectory can be implemented by an individual application or a corresponding functional module. The image condition can be determined from a whitelist of the application. If the whitelist of the application includes the application used to generate the image based on the trajectory or the application corresponding to the functional module, the application can be determined to satisfy the image condition.

In some embodiments, if the application is determined to satisfy the image condition, and after the user selects the identifier of the image of the candidate option, a preview of the image can be displayed in the input box of the application by using the image as the input. The image can include a static image or a dynamic image.

In some embodiments, for example, for instant messaging software, after the image (e.g., the dynamic image) is displayed in the input box of the application, the dynamic image can be sent to an opposite user by receiving a click operation of a current user on a sending control key. Thus, an animation effect of the dynamic image can be displayed in a chat window corresponding to the instant messaging software.

By determining whether the application satisfies the image condition, whether the image generated based on the trajectory is displayed in the display area as the candidate option can be determined. Thus, the identifier of the image generated based on the trajectory can be avoided to be used as an invalid candidate option when the application does not support the image condition. When the user determines and selects the identifier of the image, the image corresponding to the identifier of the image cannot be displayed in the corresponding position of the application causing poor user experience.

In embodiments of the present disclosure, the user input can be obtained. The user input can represent at least one trajectory. The recognition can be performed on the trajectory to obtain at least one matching result based on the database. The at least one trajectory can be recorded to generate the image of the at least one trajectory. The candidate option can be output. The candidate option can include the at least one matching result and the identifier of the image. Thus, based on the at least one trajectory input by the user, the at least one matching result can be obtained, and the image including the at least one trajectory can be obtained simultaneously. Thus, the output candidate option of the application can include the at least one matching result and the identifier of the image. When being used by the user, the user can directly select the matching result or the identifier of the image in the candidate option. By ensuring the diversity of the information contents, the plurality of times of interactions between the user and the application can be avoided to improve the user experience.

In some embodiments, the function of generating the image based on the trajectory can be implemented by an image processing application or an image processing module independent of the input method application. When the handwriting input mode of the input method application is entered, the input method application can be controlled to send a request message for starting an image function to the image processing application or the image processing module. Thus, the image processing application or the image processing module can be started.

In some other embodiments, a hand-drawing function start-control key can be arranged in the handwriting input box corresponding to the handwriting input method. When a current state of the hand-drawing function start-control key is an enabled state, for example, a user clicks the hand-drawing function start control key, the input method application program can be controlled to send a request message for starting a hand-drawing function to the image processing application program or the image processing module. After the image processing application program or the image processing module is started, the trajectory input by the user can be recorded, the corresponding image can be generated based on the trajectory and saved.

An implementation process of embodiments of the present disclosure is described in an actual application scenario below.

Figure 5:
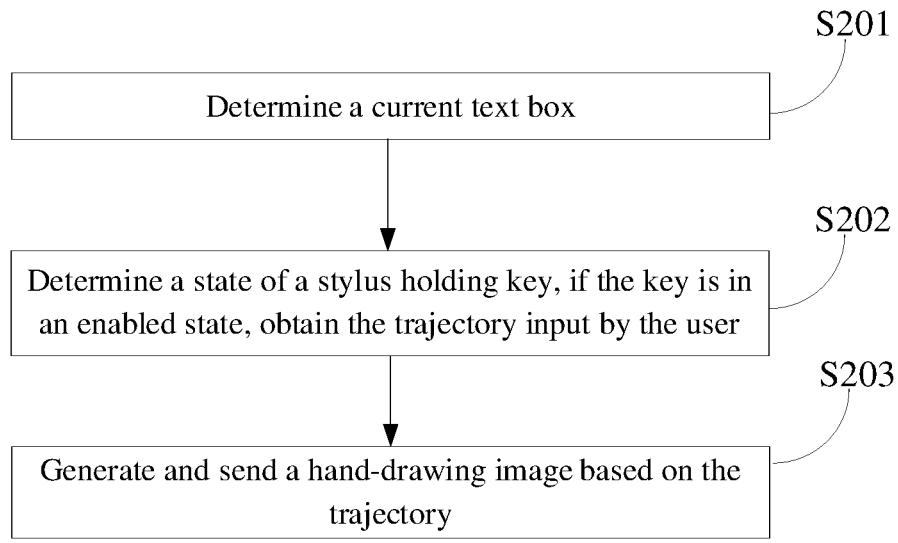
FIG. 5 illustrates a schematic flowchart of a manual drawing information sharing method according to some embodiments of the present disclosure.

In some embodiments, FIG. 5 illustrates a schematic flowchart of a manual drawing information sharing method according to some embodiments of the present disclosure. The hand-drawing information sharing method of embodiments of the present disclosure is applied to a hand-drawing information sharing system 1. The system includes a hand-drawing information generation system 11, a system input method module 12, and a system input management subsystem 13. The hand-drawing information sharing method of embodiments of the present disclosure is implemented through processes S201 to S203, which are described in detail below.

At S201, a current text box (corresponding to the input box of other embodiments) is determined.

In the system input management subsystem (for example, the android system input management subsystem), if the application is determined to display the text box, it is determined that the content needs to be input in the text box to call the system input method or the input method application.

At S202, a state of a stylus holding key is determined. If the key is in an enabled state, the trajectory (corresponding to the at least one trajectory of other embodiments) input by the user is obtained.

When whether the system input method is called is determined, for example, when the application displays the text box, and a cursor flickers in the text box, if a pressing operation on the hand-drawing function key of the stylus that is in communication connection with the system input method is received, the handwriting input box can be displayed, and the trajectory input by the user can be obtained.

At S203, a hand-drawing image is generated based on the trajectory and transmitted.

After the trajectory input by the user is obtained, the trajectory can be sent to a hand-drawing information generation system, and the hand-drawing image can be generated by the hand-drawing information generation system. The hand-drawing image can correspond to the at least trajectory image of other embodiments of the present disclosure.

In embodiments of the present disclosure, whether the hand-drawing function needs to be called is determined based on the state of the hand-drawing function key of the stylus. When the hand-drawing function key is in the enabled state, the hand-drawing information function can be directly started to complete the generation of the hand-drawing image. The hand-drawing image can be a static picture or an animation. According to embodiments of the present disclosure, in the handwriting of the handwriting method, the handwriting trajectory can be recorded, and the hand-drawing image can be generated. Thus, when the user performs input on any one input box, the character and graphic (e.g., a expression identifier) can be matched, and the hand-drawing image can also be provided. Thus, the input efficiency of the user can be effectively improved, and the cumbersome interaction of back-and-forth jumping among different applications can be reduced. The hand-drawing image can include at least one of the static image or the dynamic image. The static image can be a final hand-drawing image generated according to the recorded handwriting trajectory. The dynamic image can be used to represent a process of generating the final hand-drawing image. The dynamic image can include an image of the handwriting trajectory at each moment and the final hand-drawing image generated according to the recorded handwriting trajectory.

Figure 6:
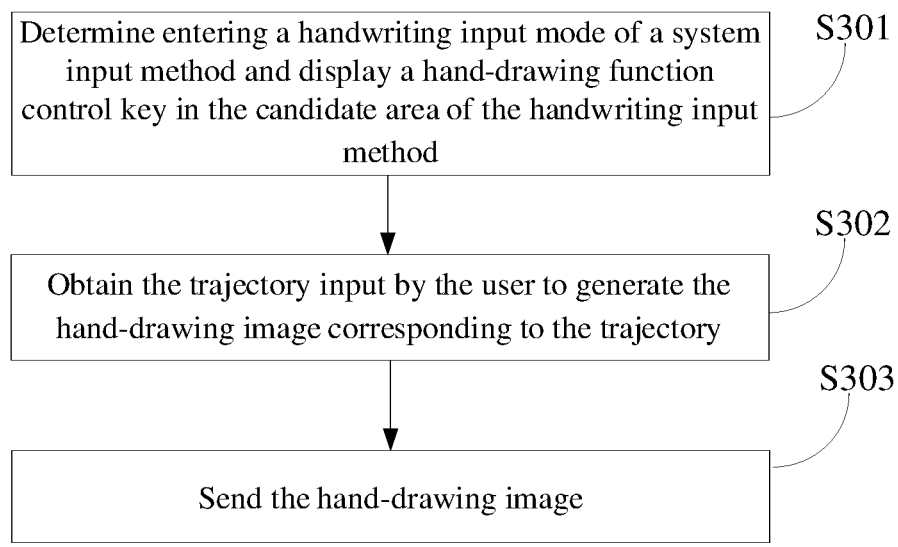
FIG. 6 illustrates a schematic flowchart of another manual drawing information sharing method according to some embodiments of the present disclosure.

FIG. 6 illustrates a schematic flowchart of another manual drawing information sharing method according to some embodiments of the present disclosure. The hand-drawing information-sharing method of embodiments of the present disclosure is implemented by processes S301 to S303, which are described in detail below.

At S301, entering a handwriting input mode of a system input method is determined, and a hand-drawing function control key is displayed in the candidate area of the handwriting input method.

Figure 7:
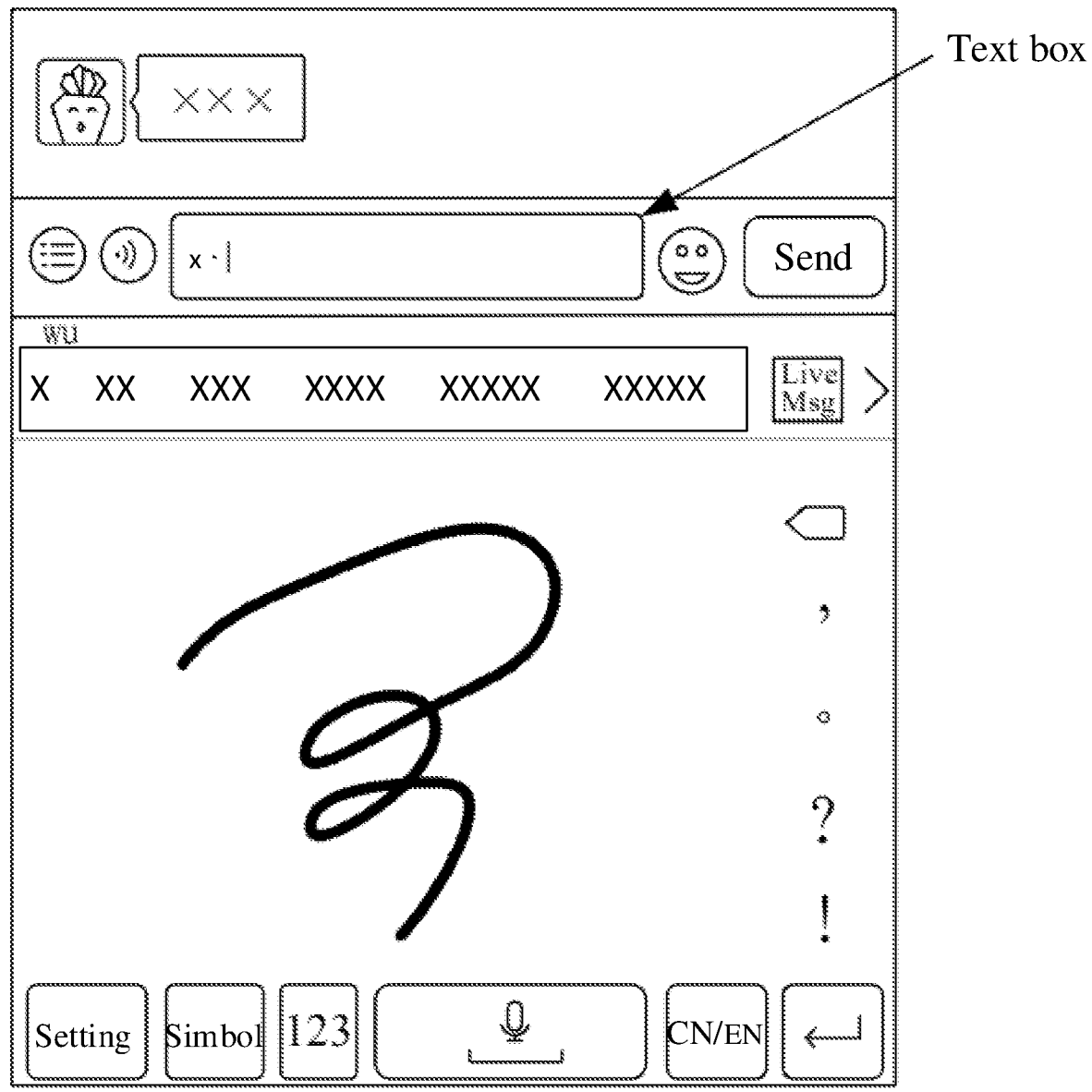
FIG. 7 illustrates a schematic diagram of a manual drawing information generation interface according to some embodiments of the present disclosure.

In some embodiments, FIG. 7 illustrates a schematic diagram of a manual drawing information generation interface according to some embodiments of the present disclosure. As shown in FIG. 7, determining entering the handwriting input mode of the system input method includes displaying the text box of the application. When the cursor is located in the text box, the system input method can be started, and the handwriting input mode can be entered. Then, the hand-drawing function control key (corresponding to Live Msg control key in FIG. 7) can be displayed in the candidate area of the handwriting input method. When the operation of the user on the hand-drawing function control key is received, the hand-drawing function control key can be determined to be in the enabled state, and the hand-drawing information generation system can be stated.

At S302, the trajectory input by the user is obtained, and the hand-drawing image corresponding to the trajectory is generated.

In the handwriting input area of the system input method, the trajectory input by the user can be obtained. The trajectory can be recorded and sent to the hand-drawing information generation system. The hand-drawing image corresponding to the trajectory can be generated by the hand-drawing information generation system. The identifier of the image (corresponding to the identifier of the image of other embodiments) corresponding to the hand-drawing image can be displayed in the candidate area of the system input method.

In some embodiments, the identifier of the image corresponding to the hand-drawing picture can be used as the first option of the candidate area or a non-first option. The identifier of the image can be a thumbnail corresponding to the hand-drawing image or another generated identifier used to represent that the hand-drawing image has been generated. In some embodiments, the identifier of the image includes a Live Msg identifier as shown in FIG. 7. Live Msg is not a hand-drawing function control key and is only used as the identifier of the image corresponding to the hand-drawing image.

At S303, the hand-drawing image is sent.

When a click or touch operation of the user on the identifier of the image corresponding to the hand-drawing image is received, the hand-drawing image can be displayed in the text box of the application or sent to the application for storage.

In some embodiments, after the system input method is started, and the handwriting input mode is entered, the hand-drawing function control key for the user to start the hand-drawing function can be displayed on a handwriting input method interface. The hand-drawing function control key is the hand-drawing function control key Live Msg shown in the candidate area of FIG. 7. Thus, for a new user who never uses a hand-drawing information function, the hand-drawing function can be quickly started by clicking or touching the hand-drawing function control key. After the user enters the trajectory, the matching in the character and the graphic can be performed on the trajectory input by the user. Meanwhile, the hand-drawing image can be generated based on the trajectory input by the user.

In some other embodiments, the hand-drawing function control key Live Msg in FIG. 7 is used as a control key for locking the hand-drawing function. When the user clicks on the text box and starts the system input method, the hand-drawing function control key Live Msg can be displayed on the system input method interface. When the user clicks or touches the hand-drawing function control key, the hand-drawing function can be directly started, and the handwriting input function can be shielded. That is, after the user inputs the trajectory, the matching in the character and the graphic cannot be performed, only the hand-drawing image can be generated based on the trajectory. Thus, when the user triggers the hand-drawing function control key, that is, locks the hand-drawing function, the matching cannot be performed on the handwriting input. However, the trajectory can be still input through the same input area of embodiments of the present disclosure. In the input method, the matching of the character and the ized image, e.g., expression, is no longer performed, and only the input trajectory can be recorded to generate the hand-drawing image (static or dynamic). After the user clicks on the hand-drawing function control key Live Msg, the hand-drawing function can be unlocked. In some other embodiments, the user can add the hand-drawing image into the input box to automatically unlock the hand-drawing function. In some other embodiments, after the user adds the hand-drawing image into the input box and performs the transmission instruction, the hand-drawing function can be automatically unlocked. In some other embodiments, after the input method is switched to run in the background or closed, the hand-drawing function can be automatically unlocked.

In embodiments of the present disclosure, in the handwriting of the input method, the handwriting trajectory can be recorded, and the hand-drawing image can be generated. Thus, when the user performs the input on any one input box, the character and graphic (e.g., a expression identifier) can be matched, and the hand-drawing image can also be provided. Thus, the input efficiency of the user can be effectively improved, the cumbersome interaction of back-and-forth jumping among different applications can be reduced. The hand-drawing image can include at least one of the static image or the dynamic image. The static image can be a final hand-drawing image generated according to the recorded handwriting trajectory. The dynamic image can be used to represent a process of generating the final hand-drawing image. By arranging the hand-drawing function key in the candidate area of the system input method, when the hand-drawing function control key is triggered, the hand-drawing information system can be directly started to complete the recording of the trajectory input by the user and the generation of the hand-drawing image. After the hand-drawing image is generated, the identifier of the image corresponding to the hand-drawing image can be displayed in the candidate area of the system input method. When the user clicks on the identifier of the image, the hand-drawing image can be sent out or saved.

Figure 8:
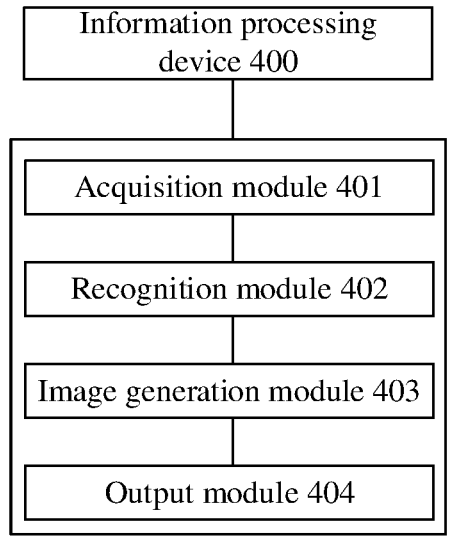
FIG. 8 illustrates a schematic structural diagram of an information processing device according to some embodiments of the present disclosure.

FIG. 8 illustrates a schematic structural diagram of an information processing device 400 according to some embodiments of the present disclosure. As shown in FIG. 8, the information processing device 400 includes an acquisition module 401, a recognition module 402, an image generation module 403, and an output module 404.

The acquisition module 401 can be configured to obtain the user input. The user input can represent the at least one trajectory.

The recognition module 402 can be configured to perform the recognition on the trajectory to obtain the at least one matching result based on the matching in the database.

The image generation module 403 can be configured to record the at least one trajectory and generate the image including the at least one trajectory.

The output module 404 can be configured to output the candidate option. The candidate option can include the at least one matching result and the identifier of the image.

In some embodiments of the present disclosure, the acquisition module 401 can be further configured to obtain the N-th trajectory, and obtain the (N+1)-th trajectory before the N-th trajectory reaches the disappearance time. N can be an integer greater than or equal to 1. The N-th trajectory reaching the disappearance time can represent that the user input is completed.

In some embodiments of the present disclosure, the recognition module 402 can be further configured to perform the recognition on the trajectory to obtain the at least one character based on the matching in the character database, and perform the recognition on the trajectory to match the at least one graphic based on the graphic database.

In some embodiments of the present disclosure, the recognition module 402 can be further configured to perform the recognition on the combination of the N-th trajectory and the (N+1)-th trajectory if the (N+1)-th trajectory is determined to be obtained.

In some embodiments of the present disclosure, the output module 404 can be further configured to, if the at least one matching result does not include the matching result satisfying the accurate matching condition is determined, use the identifier of the image as the first option of the candidate option, and output the candidate option according to the sequence of the identifier of the image and the at least one matching result.

In some embodiments of the present disclosure, the output module 404 can be further configured to recognize the type of the application. The application can be the application that supports the candidate option as the input. If the type of the application satisfies the image condition, the output candidate option can include the identifier of the image.

In some embodiments of the present disclosure, the image generation module 403 can be further configured to recognize the type of the application. The application can be the application that includes the input box, and the cursor can be located in the input box. If the type of the application satisfies the image condition, the at least one trajectory can be recorded, and the image including the at least one trajectory can be generated.

Figure 9:
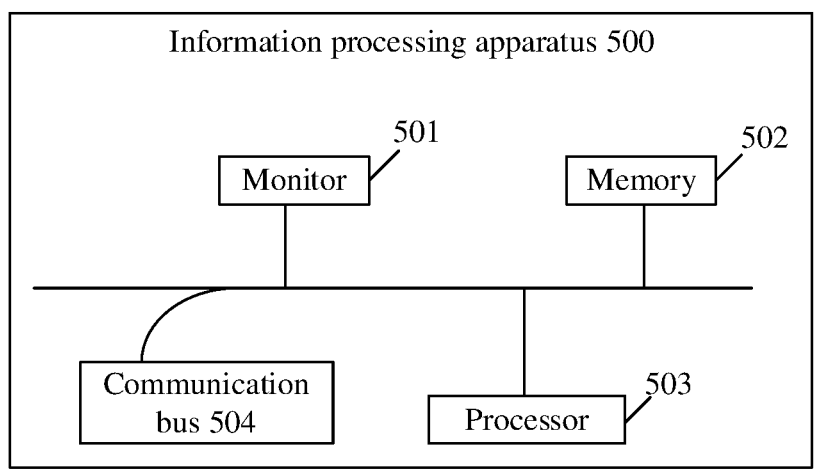
FIG. 9 illustrates a schematic structural diagram of an information processing apparatus according to some embodiments of the present disclosure.

FIG. 9 illustrates a schematic structural diagram of an information processing apparatus 500 according to some embodiments of the present disclosure. As shown in FIG. 9, an information processing apparatus 500 includes a monitor 501, a memory 502, and a processor 503. The monitor 501, the memory 502, and the processor 503 are connected by a communication bus 504. The monitor 501 can be configured to output a to-be-displayed content. The memory 502 can be used to store executable information processing instructions. The processor 503 can be configured to, when executing the executable information processing instructions stored in the memory, implement the method of embodiments of the present disclosure. For example, the information processing method of embodiments of the present disclosure can be provided.

In embodiments of the present disclosure, the processor 503 can include at least one of an application-specific integrated circuit (ASIC), a digital signal processor (DSP), a digital signal processing device (DSPD), a programable logic device (PLD), a field programable gate array (FPGA), a central processing unit (CPU), a controller, a microcontroller, or a microprocessor. For different apparatuses, the electronic device for implementing the above-described processor function can include other electronic devices, which is not limited to the present disclosure.

In embodiments of the present disclosure, the processor 503 can be configured to obtain the user input. The user input can represent the at least one trajectory. The processor 503 can be configured to perform the recognition on the trajectory, obtain the at least one matching result based on the database, record the at least one trajectory to generate the image including the at least one trajectory, and output the candidate option. The candidate option can include the at least one matching result and the identifier of the image.

Embodiments of the present disclosure further provide a computer-readable storage medium storing the executable information processing instructions that, when executed by the processor 503, cause the processor 503 to implement the method of embodiments of the present disclosure, for example, the executable information processing method of embodiments of the present disclosure. For example, the information processing method of embodiments of the present disclosure can be stored on a storage medium such as an optical disc, a hard disk, a USB disk, etc. When an program instruction corresponding to an information processing method in the storage medium is read or executed by an electronic apparatus, the information processing method of embodiments of the present disclosure can be implemented.

Those skilled in the art should understand that embodiments of the present disclosure can be provided as a method, an apparatus, or a computer program product. Accordingly, the present disclosure can be in a form of a hardware embodiment, a software embodiment, or a combination thereof. Embodiments of the present disclosure can use a form of implementing a computer program product on one or more computer-executable storage media (including but is not limited to the disc storage or optical storage) including computer program codes.

The present disclosure can be described with reference to a flowchart and/or a block diagram of the method, the apparatus, or the computer program product of embodiments of the present disclosure. Each flow and/or block of the flow diagram and/or block diagram, and a combination of the flow and/or block in the flow diagram and/or block diagram can be implemented by the computer program instructions. These computer program instructions can be provided to a processor of a general-purpose computer, a special-purpose computer, an embedded processor, or another programmable information processing apparatus to produce a machine. Thus, the instructions executed by the processor of the computer or the another programmable information processing apparatus can be used to produce a device configured to implement the function determined in one flow or a plurality of flows of the flowchart and/or one block or a plurality of blocks of the block diagram.

These computer program instructions can also be stored in a computer-readable memory that can direct a computer or another programmable information processing apparatus to function in a particular manner. Thus, the instructions stored in the computer-readable memory can produce a manufactured product including the instruction. The instruction device can be configured to implement the function determined in one flow or a plurality of flows of the flowchart and/or one block or a plurality of blocks of the block diagram.

These computer program instructions can also be loaded onto the computer or the another programmable information processing apparatus to cause a series of operational processes to be performed on the computer or the another programmable apparatus to produce a processing implemented by the computer. Thus, the instructions executed by the computer or the another programmable apparatus can provide processes used to implement the function determined in one flow or a plurality of flows of the flowchart and/or one block or a plurality of blocks of the block diagram.

The above description illustrates embodiments of the present disclosure, and is not intended to limit the scope of the present disclosure. Any modifications, equivalent replacements, and improvements made within the spirit and scope of the present disclosure are within the protection scope of the present disclosure.

What is claimed is:

1. An information processing method comprising:
receiving a user input, the user input representing a trajectory;
performing recognition on the trajectory to obtain a matching result based on matching in a database;
recording the trajectory to generate an image including the trajectory; and
outputting a candidate option, the candidate option including the matching result obtained from the trajectory and an identifier of the image generated from the trajectory.

2. The method according to claim 1, wherein obtaining the user input includes:
obtaining an N-th trajectory; and
obtaining an (N+1)-th trajectory before the N-th trajectory reaches disappearance time, N being an integer greater than and equal to 1, and the N-th trajectory reaching the disappearance time representing that the user input is complete.

3. The method according to claim 2, wherein performing the recognition on the trajectory to obtain the matching result based on the matching in the database includes:
performing the recognition on the trajectory to obtain a character based on matching in a character database; and/or
performing the recognition on the trajectory to obtain a graphic based on matching in a graphic database.

4. The method according to claim 3, wherein performing the recognition on the trajectory includes:
in response to obtaining the (N+1)-th trajectory, performing the recognition on a combination of the N-th trajectory and the (N+1)-th trajectory.

5. The method according to claim 1, wherein outputting the candidate option includes:
in response to the matching result not including a matching result satisfying an accurate matching condition, using the identifier of the image as a first option of the candidate option; and
outputting the candidate option according to a sequence of the identifier of the image and the matching result.

6. The method according to claim 1, wherein outputting the candidate option includes:
recognizing a type of an application, and
in response to the type of the application satisfying an image condition, outputting the identifier of the image included in the candidate option.

7. The method according to claim 1, wherein recording the trajectory to generate the image including the trajectory includes:
recognizing a type of an application, and
in response to the type of the application satisfying the image condition, recording the trajectory to generate the image including the at least trajectory.

8. The method according to claim 1, further comprising:
displaying a preview of the image in an input box in response to a selection for the identifier; and
wherein the image is one of a static image and a dynamic image, the dynamic image being used to represent a process of forming the image with a plurality of trajectories.

9. The method according to claim 1, wherein:
the trajectory is input in an input area of a user interface of the input method application program; and
the candidate option is output in a candidate area of the user interface of the input method application program.

10. An information processing apparatus comprising:
a monitor configured to output to-be-displayed content;
a processor; and
a memory used to store executable information processing instructions that, when executed by the processor, cause the processor to:
receive a user input, the user input representing a trajectory;
perform recognition on the trajectory to obtain a matching result based on matching in a database;
record the trajectory to generate an image including the trajectory; and
output a candidate option, the candidate option including the matching result obtained from the trajectory and an identifier of an image generated from the trajectory.

11. The apparatus according to claim 10, wherein the processor is further configured to:

obtain an N-th trajectory; and obtain an (N+1)-th trajectory before the N-th trajectory reaches disappearance time, N being an integer greater than and equal to 1, and the N-th trajectory reaching the disappearance time representing that the user input is complete.

12. The apparatus according to claim 11, wherein the processor is further configured to:

perform the recognition on the trajectory to obtain a character based on matching in a character database; and/or perform the recognition on the trajectory to obtain a graphic based on matching in a graphic database.

13. The apparatus according to claim 12, wherein the processor is further configured to:

in response to obtaining the (N+1)-th trajectory, perform the recognition on a combination of the N-th trajectory and the (N+1)-th trajectory.

14. The apparatus according to claim 10, wherein the processor is further configured to:

in response to the matching result not including a matching result satisfying an accurate matching condition, use the identifier of the image as a first option of the candidate option; and output the candidate option according to a sequence of the identifier of the image and the matching result.

15. The apparatus according to claim 10, wherein the processor is further configured to:

recognize a type of an application, the application being an application supporting the candidate option as an input; and in response to the type of the application satisfying an image condition, output the identifier of the image included in the candidate option.

16. The apparatus according to claim 10, wherein the processor is further configured to:

recognize a type of an application, the application being an application including an input box with a cursor located in the input box; and in response to the type of the application satisfying the image condition, record the trajectory to generate the image including the at least trajectory.

17. The apparatus according to claim 10, wherein the processor is further configured to:

display a preview of the image in an input box in response to a selection for the identifier, the image being one of a static image and a dynamic image, the dynamic image being used to represent a process of forming the image with a plurality of trajectories.

18. A non-transitory computer-readable storage medium storing executable information processing instructions that, when executed by a processor, cause the processor to:

receive a user input, the user input representing a trajectory;

perform recognition on the trajectory to obtain a matching result based on matching in a database;

record the trajectory to generate an image including the trajectory; and output a candidate option, the candidate option including the matching result obtained from the trajectory and an identifier of an image generated from the trajectory.

19. The storage medium according to claim 18, wherein the processor is further configured to:

obtain an N-th trajectory; and obtain an (N+1)-th trajectory before the N-th trajectory reaches disappearance time, N being an integer greater than and equal to 1, and the N-th trajectory reaching the disappearance time representing that the user input is complete.

20. The storage medium according to claim 19, wherein the processor is further configured to:

perform the recognition on the trajectory to obtain a character based on matching in a character database; and/or perform the recognition on the trajectory to obtain a graphic based on matching in a graphic database.

* * * * *